United States Patent [19]

Sugano

[11] Patent Number: 5,016,496
[45] Date of Patent: May 21, 1991

[54] SHIFT CONTROL SYSTEM FOR ENGINE BRAKING IN AN AUXILIARY TRANSMISSION

[75] Inventor: Kazuhiko Sugano, Yokohama, Japan

[73] Assignee: Nissan Motor Co., Ltd., Yokohama, Japan

[21] Appl. No.: 384,692

[22] Filed: Jul. 25, 1989

[30] Foreign Application Priority Data

Jul. 25, 1988 [JP] Japan ................................ 63-183634

[51] Int. Cl.⁵ ............................................ D16H 61/04
[52] U.S. Cl. ...................................... 74/868; 475/282
[58] Field of Search ..................... 74/752 C, 867, 740; 475/55, 282, 271, 283

[56] References Cited

U.S. PATENT DOCUMENTS 2,770,151 11/1956 Cartwright et al. ............. 475/282 X
2,894,415 7/1959 Miller .................................... 475/55
2,911,853 11/1959 Sand ................................. 475/283 X
2,929,271 3/1960 Miller .................................... 475/55
4,730,521 3/1988 Hayasaki et al. ..................... 74/867
4,765,202 8/1988 Hayasaki ........................ 74/752 C X

OTHER PUBLICATIONS

Service Manula of Toyota Supra, Feb. 1986.

Primary Examiner—Leslie A. Braun
Assistant Examiner—Khoi Q. Ta
Attorney, Agent, or Firm—Foley & Lardner, Schwartz, Jeffery, Schwaab, Mack, Blumenthal & Evans

[57] ABSTRACT

A shift control system for an automatic transmission comprises a shift valve for an auxiliary gear train, an orifice bypass passage and an accumulator for low gear train. The shift valve includes a spool which is movable between a first position where the hydraulic fluid is supplied to a first passage and hydraulic fluid is discharged from a second passage, and a second position where the hydraulic fluid is supplied to the second passage and hydraulic fluid is discharged from the first passage. The orifice bypass valve includes a spool and a pilot port. The former is movable between an interrupting position where the first passage is interrupted from a third passage, and a connecting position where the first passage is connected to the third passage, and it is pressed to the interrupting position by a spring. The latter is connected with a fourth passage or engine brake passage.

5 Claims, 5 Drawing Sheets

FIG. 4

| | | C18 | C20 | C22 | C24 | B28 | B26 | OWC 30 | OWC 29 | C32 | B33 | OWC 34 | GEAR RATIO OF OVERALL TRANSMISSION | $\alpha_1, \alpha_2, \alpha_3 = 0.45$ | GEAR RATIO OF MAIN POWERTRAIN | GEAR RATIO OF AUXILIARY POWERTRAIN |
|---|---|---|---|---|---|---|---|---|---|---|---|---|---|---|---|---|
| D RANGE | 1ST. SPEED | | | ○ | | | | ○ | ○ | | ○ | ○ | $\left(\dfrac{1+\alpha_2}{\alpha_2}\right)(1+\alpha_3)$ | 4.67 | 3.22 | 1.45(LOW) |
| | 2ND. SPEED | | ○ | ○ | | ○ | | ○ | | | ○ | ○ | $\dfrac{(\alpha_1+\alpha_2+\alpha_1\alpha_2)}{\alpha_2(1+\alpha_1)}(1+\alpha_3)$ | 2.45 | 1.69 | 1.45(LOW) |
| | 3RD. SPEED | | ○ | ○ | ○ | | | ○ | | ○ | ○ | ○ | $1+\alpha_3$ | 1.45 | 1.00 | 1.45(LOW) |
| | 4TH. SPEED | | | ○ | ○ | | | ○ | | ○ | | | 1 | 1.00 | 1.00 | 1.00(HIGH) |
| | 5TH. SPEED | | | (○) | | ○ | | | | | | | $\dfrac{1}{1+\alpha_1}$ | 0.69 | 0.69 | 1.00(HIGH) |
| ENGINE BRAKE RUNNING STATE | 1ST. SPEED | | ○ | (○) | | | | (○) | (○) | | ○ | (○) | | | | |
| | 2ND. SPEED | | ○ | (○) | | ○ | | (○) | | | ○ | (○) | | | | |
| | 3RD. SPEED | | ○ | (○) | ○ | | | (○) | | ○ | ○ | (○) | | | | |
| | 4TH. SPEED | | | (○) | ○ | | | (○) | | ○ | | | | | | |
| | 5TH. SPEED | | | (○) | | ○ | | | | | | | | | | |
| REVERSE | | ○ | | | | | ○ | | | | ○ | ○ | $-\dfrac{1+\alpha_3}{\alpha_1}$ | −3.22 | | |

( ) UNRELATED TO POWER TRANSMISSION

SHIFT CONTROL SYSTEM FOR ENGINE BRAKING IN AN AUXILIARY TRANSMISSION

BACKGROUND OF THE INVENTION

The present invention relates to a shift control system for an automatic transmission.

An example of a shift control system is included in a hydraulic circuit of an A340E type automatic transmission described in a Service Manual of TOYOTA SUPRA issued in February 1986. The A340E type automatic transmission includes an auxiliary gear train coupled with a 3-speed main gear train. The auxiliary gear train includes a planetary gear set, an one-way clutch, a direct clutch and an OD brake, and is constructed such that the planetary gear set is locked to rotate as an unit when the direct clutch is engaged, and the planetary gear set is in an accelerating state or an over-drive state when the OD brake is engaged. Upon shifting from the 4th speed to the 3rd speed, it is necessary to release the OD brake engaged and engage the direct clutch. Thus, a hydraulic pressure supply to the direct clutch and the OD brake is modulated by a 3-4 shift valve. In this case, the direct clutch should be engaged after the OD brake is completely released. A torque can be transmitted by the one-way clutch in the event of the OD brake disengaged. The direct clutch engaged in this state assures smooth shifting. If the direct clutch is engaged before the OD brake is completely disengaged, there arises an interlock state that two friction elements are simultaneously engaged, causing inconvenience such as a great shifting shock. For preventing such inconvenience, an accumulator is disposed to a hydraulic passage through which the direct clutch is subject to an hydraulic pressure. The hydraulic pressure actuating the direct clutch is kept low while a piston of the accumulator strokes so that the direct clutch can not be engaged. When the stroke of the piston is completed after a predetermined period of time, the hydraulic pressure of the direct clutch is increased. In this manner, since the direct clutch is not engaged during the stroke of the piston, the hydraulic pressure of the OD brake is discharged, thus disengaging the brake. Specifically, the accumulator gives a time lag on engagement of the direct clutch.

With the above-mentioned shift control system, however, the accumulator always gives the time lag on engagement of the direct clutch, so that shifting is appropriately performed during a normal run of a vehicle. However, a shift responsibility is not satisfactory in the event that an engine brake is needed. Specifically, the time lag is not regarded as considerable in the event of 4-3 shifting with increase of depression of an accelerator pedal, while the time lag is regarded as considerable in the event of selecting to 3 range because a driver will expect an immediate occurrence of an engine brake effect, causing unsatisfactory of the shift responsibility.

Therefore, an object of the present invention is to provide a shift control system for an automatic transmission which gives a rapid shift responsibility on engine brake.

SUMMARY OF THE INVENTION

There is provided, according to the present invention, a shift control system for an automatic transmission, the automatic transmission including a main gear train and an auxiliary gear train operatively coupled therewith, the auxiliary gear train including a first friction element for high gear position and a second friction element for low gear position, the shift control system including;

a source of hydraulic fluid,
a first hydraulic passage connected with a third hydraulic passage through an orifice,
a second hydraulic passage connected with the first friction element,
a third hydraulic passage connected with the second friction element,
a fourth hydraulic passage,
means for supplying the hydraulic fluid to said fourth hydraulic passage when an engine brake is required,
an accumulator including a working pressure chamber and a back pressure chamber, said working pressure chamber being connected with said third passage,
a shift valve including a spool movable between a first position where the hydraulic fluid is supplied to said first passage and hydraulic fluid is discharged from said second passage, and a second position where the hydraulic fluid is supplied to said second passage and hydraulic fluid is discharged from said first passage, and
an orifice bypass valve, said orifice bypass valve including a spool, a spring and a pilot port, said spool being movable between an interrupting position where said first passage is interrupted from said third passage, and a connecting position where said first passage is connected to said third passage, said spool being pressed to said inneterrupting position by said spring, said pilot port inducing a force by which said spool is pressed in the direction opposite to a force of said spring when the hydraulic fluid is supplied, said pilot port being connected with said fourth passage.

BRIEF DESCRIPTION OF THE DRAWINGS

FIG. 4 is a table illustrating the combination of elements operating in each of the gear positions.

DETAILED DESCRIPTION OF THE INVENTION

Figure 3:
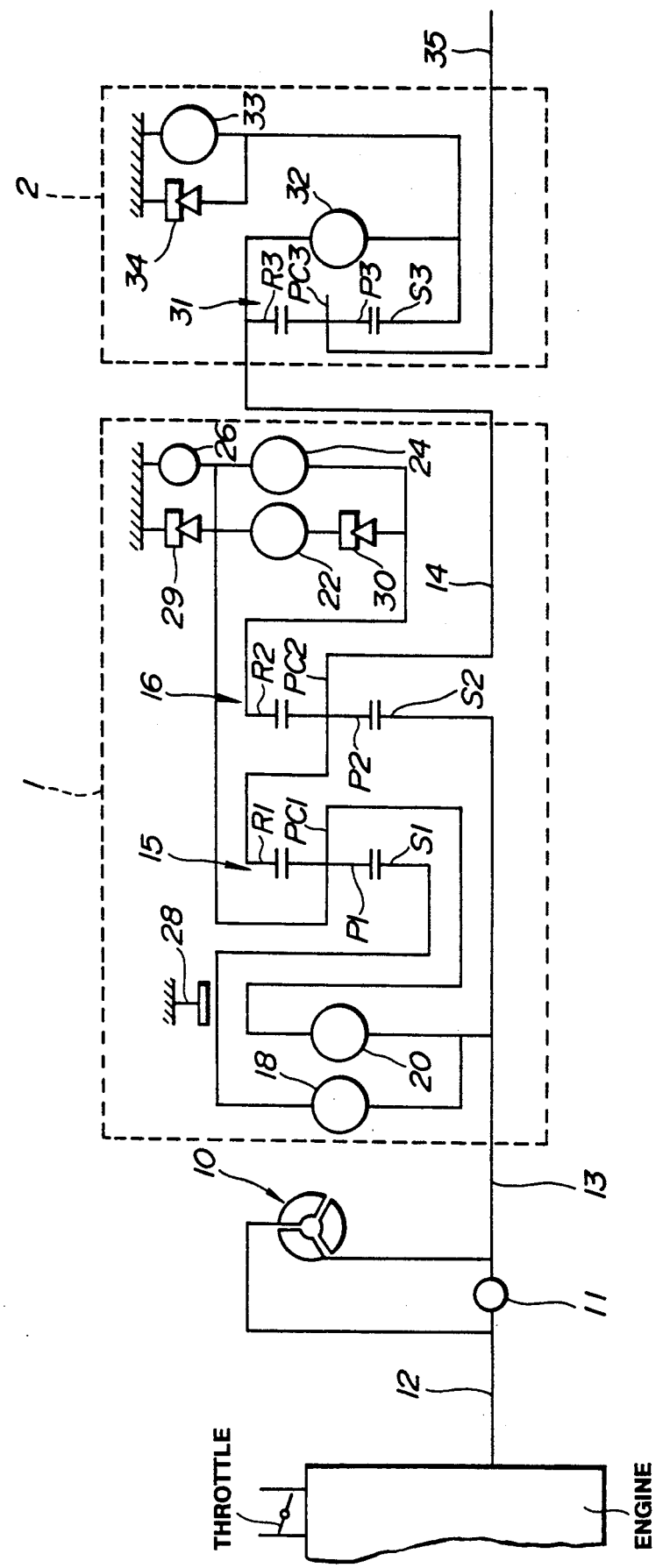
FIG. 3 is a schematic illustration of a power train of an automatic transmission.

FIG. 3 is a schematic illustration of a power train of an automatic transmission having five speed positions and one reverse position. This power train comprises a torque converter 10, a main gear train 1, and an auxiliary gear train 2. The torque converter 10 to which a torque is inputted from an engine output shaft 12 incorporates a lock-up clutch 11.

The main gear train 1 includes an input shaft 13 to which a torque is transmitted from the torque converter 10, an intermediate shaft 14 which transmits a driving force to the auxiliary gear train 2, a 1st planetary gear set 15, a 2nd planetary gear set 16, a reverse clutch 18, a high clutch 20, a forward clutch 22, an overrunning clutch 24, a low and reverse brake 26, a band brake 28, a low one-way clutch 29, and a forward one-way clutch 30. The 1st planetary gear set 15 comprises a sun gear S1, an internal gear R1, and a carrier PC1 which supports pinion gears P1 engaged with the two gears S1 and R1 at the same time. On the other hand, the 2nd planetary gear set 16 comprises a sun gear S2, an internal gear R2, and a carrier PC2 which supports pinion gears P2 engaged with the two gears S2 and R2 at the same time. The carrier PC1 is connectable with the input shaft 13 through the high clutch 20, while the sun gear S1 with the input gear 13 through the reverse clutch 18. The carrier PC1 is connectable with the internal gear R2 through the forward clutch 22 and the forward one-way clutch 30 connected in series therewith or through the overrunning clutch 24 disposed in parallel with both the forward clutch 22 and the forward one-way clutch 30. The sun gear S2 is always connected with the input shaft 13, while the internal gear R1 and the carrier PC2 with the intermediate shaft 14. The low and reverse brake 26 is arranged to brake the carrier PC1, while the band brake 28 the sun gear S1. The low one-way clutch 29 is disposed in a manner to allow a normal rotation of the carrier PC1, i.e., a rotation in the same direction as the engine output shaft 12, and prevent a reverse rotation of the carrier PC1, i.e., a rotation in the opposite direction to the normal rotation.

The auxiliary gear train 2 comprises a 3rd planetary gear set 31, a direct clutch 32, a reduction brake 33, and a reduction one-way clutch 34. The 3rd planetary gear set 31 comprises a sun gear S3, an internal gear R3, and a carrier PC3 which supports pinion gears P3 engaged with the two gears S3 and R3. The internal gear R3 is always connected with the intermediate shaft 14, and it is connectable with the sun gear S3 through the direct clutch 32. The sun gear S3 is adapted to be held stationary to a stationary portion by the reduction brake 33, and it is connected with the reduction one-way clutch 34 disposed in parallel with the reduction brake 33. The reduction one-way clutch 34 is disposed in a manner to allow a normal rotation of the sun gear S3 and prevent a reverse rotation thereof. The carrier PC3 is always connected with an output shaft 35.

In the above-mentioned power train, a rotational state of each of elements S1, S2, S3, R1, R2, R3, PC1, PC2 and PC3 of the planetary gear sets 15, 16 and 31 is variable owing to the operation of the clutches 18, 20, 22, 24 and 32, and the brakes 26, 28 and 33 which are activated in a predetermined pattern, thereby to change a revolution speed of the output shaft 35 relative to that of input shaft 13. The five speed positions and one reverse position are established when the clutches 18, 20, 22, 24 and 32, and the brakes 26, 28 and 33 are engaged or applied in the predetermined pattern as shown in FIG. 4. In FIG. 4, circles designate the clutches and brakes in operation, and reference numerals $\alpha1$, $\alpha2$ and $\alpha3$ ratios of number of teeth of the sun gears S1, S2 and S3 to that of the internal gears R1, R2 and R3, respectively. A gear ratio is a ratio of a revolution speed of the output shaft 35 to that of the input shaft 13.

For further understanding of the power train, reference should be made to the copending U.S. patent application Ser. No. 07/225,189 filed on July 28, 1988 by Kazuhiko SUGANO, which application has been hereby incorporated by reference.

Figure 1:
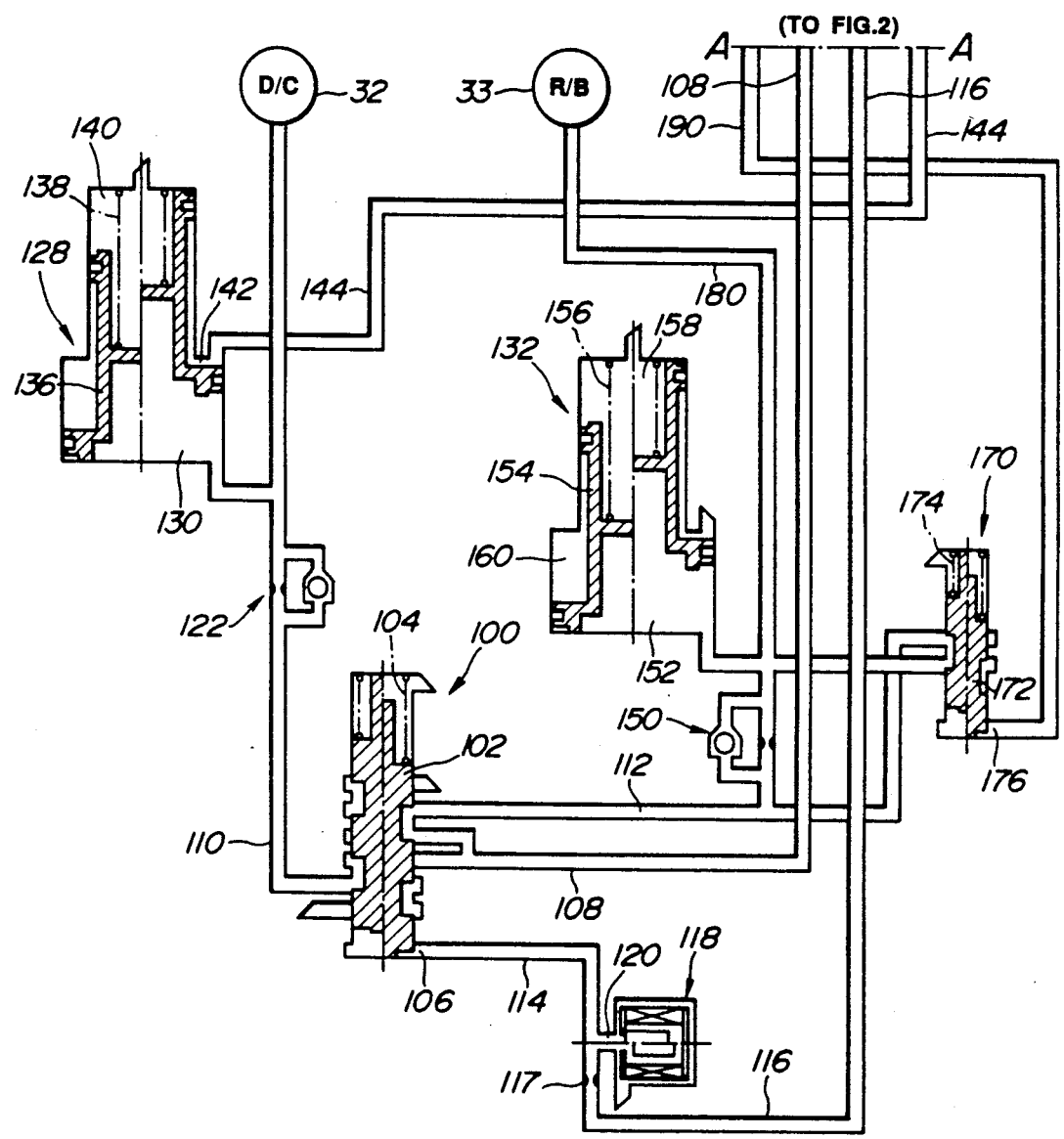
FIG. 1 is a diagrammatic view illustrating a portion of a hydraulic circuit which directly relates to the present invention.
Figure 2:
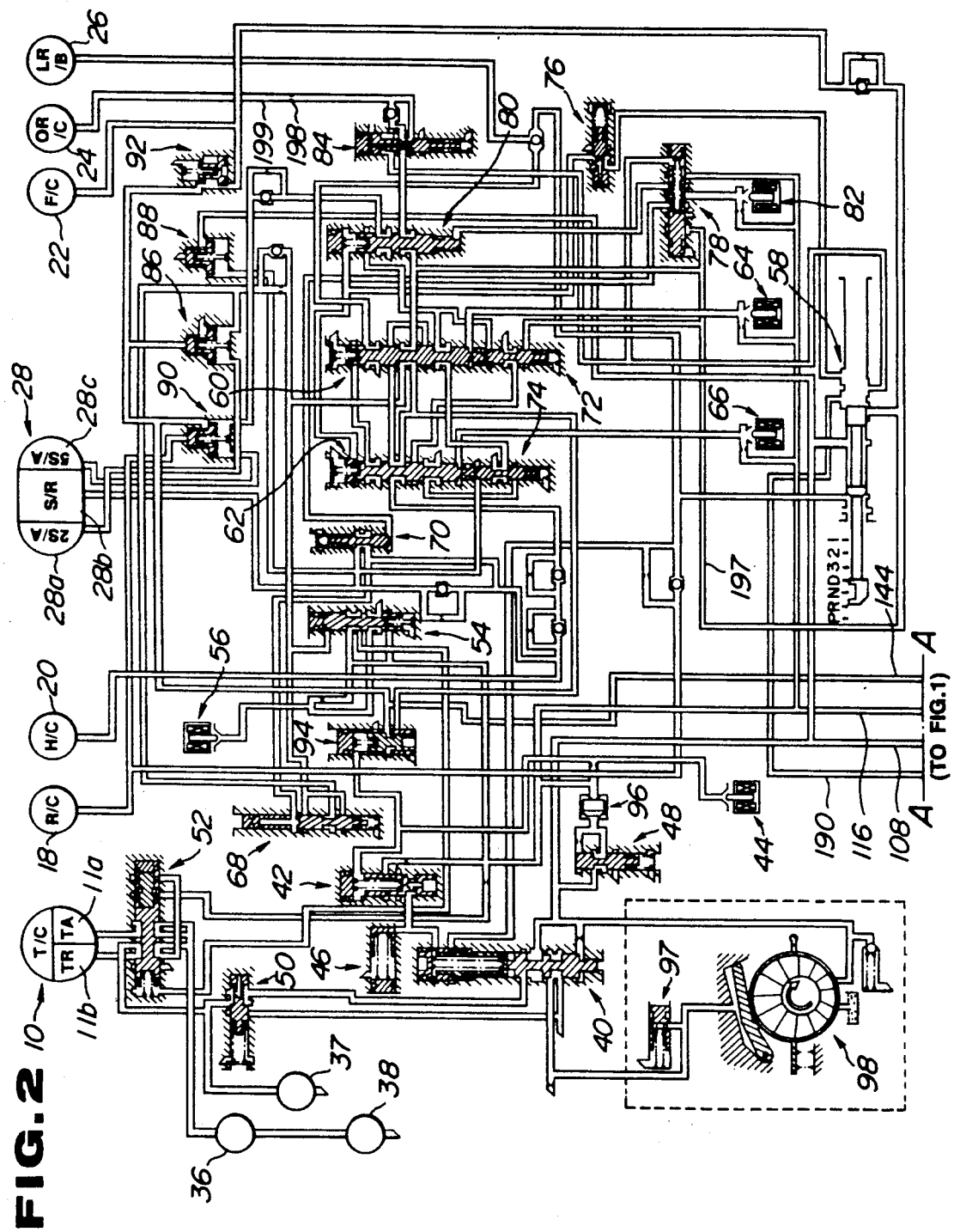
FIG. 2 is a similar view to FIG. 1, illustrating the whole of a hydraulic circuit except the portion shown in FIG. 1.

FIGS. 1 and 2 show portions of a hydraulic circuit which controls the operation of the power train. It is to be noted that a scale of FIG. 2 is reduced more than that of FIG. 1 for convenience's sake. The hydraulic circuit includes a pressure regulator valve 40, a pressure modifier valve 42, a line pressure solenoid 44, a modifier pressure accumulator 46, a pilot valve 48, a torque converter relief valve 50, a lock-up control valve 52, a 1st shuttle valve 54, a lock-up solenoid 56, a manual valve 58, a 1st shift valve 60, a 2nd shift valve 62, a 1st shift solenoid 64, a 2nd shift solenoid 66, a servo charger valve 68, a 3-2 timing valve 70, a 5-2 relay valve 72, a 5-2 sequence valve 74, a 1st reducing valve 76, a 2nd shuttle valve 78, an overrunning clutch control valve 80, an overrunning clutch solenoid 82, an overrunning clutch reducing valve 84, an 1-2 accumulator 86, a 2-3 accumulator 88, a 4-5 accumulator 90, a N-D accumulator 92, an accumulator control valve 94, a filter 96, a shift valve 100 for the auxiliary gear train 2, a shift solenoid 118 for the auxiliary gear train 2, a reduction brake accumulator 132, a direct clutch accumulator 128, and an orifice bypass valve 170 which are interconnected as shown in FIGS. 1 and 2, and are connected to the torque converter 10 wherein an apply chamber 11a and a release chamber 11b of the lock-up clutch 11 are formed, and the lock-up clutch 11 is disengaged when the release chamber 11b is subject to a hydraulic pressure and engaged when the apply chamber 11a is subject to the hydraulic pressure, the forward clutch 22, the high clutch 20, the band brake 28 wherein an apply chamber for the 2nd speed position 28a, a release chamber for the 3rd and 4th speed positions 28b and an apply chamber for the 5th speed position 28c are formed, the reverse clutch 18, the low and reverse brake 26, the overrunning clutch 24, the direct clutch 32, and the reduction brake 33, and are further connected to a variable delivery vane-type oil pump 98 with a feed-back accumulator 97, an oil cooler 36, a front lubricating circuit 37, and a rear lubricating circuit 38 as shown in FIGS. 1 and 2. A detailed description of the hydraulic circuit including these valves is omitted, it may be deduced by making a reference to the U.S. Pat. No. 4,730,521, issued to Hayasaki et al. since it discloses similar hydraulic circuit.

FIG. 1 shows a portion of the hydraulic circuit which directly relates to the present invention.

The shift valve 100 for the auxiliary gear train 2 comprises a spool 102 and a spring 104. The spool 102 is movable between an up position (or 2nd position) illustrated by the left half thereof as viewed in FIG. 1 and a down position (or 1st position) illustrated by the right half thereof as viewed in FIG. 1 on a dynamic relation between a force of a hydraulic fluid at a port 106 and that of the spring 104. When the spool 102 is at the up position, a line pressure hydraulic passage 108 is connected with a 2nd hydraulic passage 110 and a 1st hydraulic passage 112 is drained. On the other hand, when the spool 102 is at the down position, the line pressure passage 108 is connected with the 1st hydraulic passage 112 and the 2nd hydraulic passage 110 is drained. The port 106 is subject to a hydraulic pressure of a hydraulic passage 114. The passage 114 is connected to a hydraulic passage 116 to which a constant pilot pressure is always provided from the pilot valve 48 through an orifice 117. The hydraulic pressure of the hydraulic passage 114 is regulated by the shift solenoid 118 for the auxiliary gear train 2. Specifically, when the shift solenoid 118 closes an opening 120 of the hydraulic passage 114, the passage 114 is subject to the pilot pressure in a similar manner to the hydraulic passage 116. On the other hand, when the opening 120 is opened, the hydraulic passage 114 is drained.

The 2nd hydraulic passage 110 is connected to the direct clutch 32. A one-way orifice 122 is disposed at the middle of the 2nd hydraulic passage 110. The 2nd passage 110 is connected to a working pressure chamber 130 of the direct clutch accumulator 128 at its portion nearer to the direct clutch 32 than the one-way orifice 122. The direct clutch accumulator 128 comprises a stepped piston 136 and a spring 138. The working pressure chamber 130 is formed at a large diameter portion of the piston 136, and a hydraulic chamber 140 formed at a small diameter portion of the piston 136 is drained. A hydraulic chamber 142 disposed between the large and small diameter portions of the piston 136 is connected to a hydraulic passage 144. The hydraulic pressure of the passage 144 is regulated by the acculmulator valve 94.

The 1st hydraulic passage 112 is connected to the reduction brake 33. A one-way orifice 150 is disposed at the middle of the 1st hydraulic passage 112. The 1st passage 112 is connected to a working pressure chamber 152 of the reduction brake accumulator 132 at its portion nearer to the reduction brake 33 than the one-way orifice 150. The reduction brake accumulator 132 comprises a stepped piston 154 and a spring 156. The working pressure chamber 152 is formed at a large diameter portion of the piston 154, and a hydraulic chamber 158 formed at a small diameter portion of the piston 154 is drained. A hydraulic chamber 160 disposed between the large and small diameter portions of the piston 154 is also drained. The orifice bypass valve 170 comprises a spool 172 and a spring 174. The spool 172 is movable between an interrupting position where the 1st hydraulic passage 112 is prevented from communicating with the 3rd hydraulic passage 180, and a connecting position where the 1st passage is allowed to communicate with the 3rd passage, on a dynamic relation between a force of the spring 174 and that of a hydraulic fluid of the hydraulic passage 190 at a pilot port 176. That is, the spool 172 is at the interrupting position when the pilot port 176 is not subject to the hydraulic pressure, and it is at the connecting position when the port 176 is subject to the hydraulic pressure. The hydraulic pressure or 3 range pressure is outputted to the hydraulic passage 190 when the manual valve 58 is placed at 3 range.

The operation of this embodiment is as follows:

First, a description of D range is made. At the 4th or 5th speed position, the spool 102 of the shift valve 100 for the auxiliary gear train 2 is at the up position by the operation of the shift solenoid 118 for the auxiliary gear train 2. As a result, the line pressure hydraulic passage 108 is connected with the 2nd hydraulic passage 110, thus the direct clutch 32 is subject to the line pressure. On the other hand, the 1st hydraulic passage 112 is drained by the shift valve 100 so that the reduction brake 33 is kept disengaged. Thus, since the direct clutch 32 is engaged and the reduction brake 33 is disengaged, the auxiliary gear train 2 is in a direct-coupled state or high, consequently at the 4th or 5th speed position as seen from a table of FIG. 4.

Figure 5:
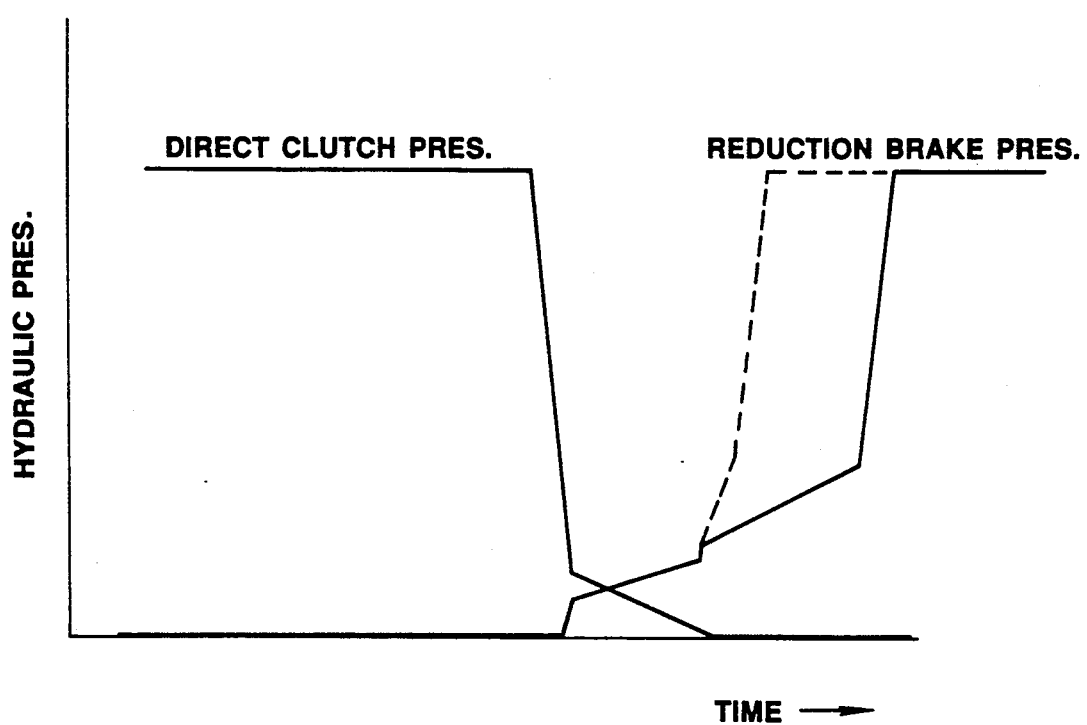
FIG. 5 is a graph illustrating a variation of the hydraulic pressure during shifting.

When the auxiliary gear train 2 is shifted from high to low, the following action is carried out: By the operation of the shift solenoid 118 for the auxiliary gear train 2, the spool 102 of the shift valve 100 for the auxiliary gear train 2 is shifted to the down position, and the 2nd hydraulic passage 110 is drained, thus the 1st hydraulic passage 112 is subject to the line pressure. The 2nd hydraulic passage 110 is drained so that the direct clutch 32 is disengaged. On the other hand, since the 1st hydraulic passage 112 is subject to the line pressure in a state that the spool 172 of the orifice bypass valve 170 is at the interrupting position, the line pressure is supplied to the working pressure chamber 152 of the reduction brake accumulator 132 through the one-way orifice 150. As a result, the piston 154 strokes against the spring 156. While the piston 154 strokes, the hydraulic pressure in the working pressure chamber 152 stays at a low level that is determined in response to the force of the spring 156. The reduction brake 33 is subject to this low hydraulic pressure so that the brake 33 is not completely engaged during this shifting. Upon completion of the stroke of the piston 154, the hydraulic pressure increases rapidly, and thus the brake 33 is completely engaged. the variations of the hydraulic pressures of the direct clutch 32 and the reduction brake 33 during this shifting are illustrated by fully drawn line in FIG. 5. As seen from this, after the hydraulic pressure of the direct clutch 32 is low enough to disengage the clutch 32, the hydraulic pressure of the reduction brake 33 begins to increase.

Even if the reduction brake 33 is engaged at a delayed timing during the above-mentioned shifting, there arises never a racing of an engine. That is, the reduction one-way clutch 34 is disposed so that, as a torque of the direct clutch 32 is decreased, the decreased torque is automatically compensated by the reduction one-way clutch 34, allowing the smooth shifting. The reduction brake 33 is completely engaged after the part of the torque is changed from the direct clutch 32 to the reduction one-way clutch 34. Thus, it is understood that a shift timing is easy to regulate due to the provision of the reduction one-way clutch 34.

Next, a description of 3 range is made. When the manual valve 58 is selected from D range to 3 range in the event that the auxiliary gear train 2 is at high, the 3 range pressure is outputted to the hydraulic passage 190, which is supplied to the pilot port 176 of the orifice bypass valve 170. As a result, the spool 172 is urged to move at the connecting position. In this state, if the shift valve 100 for the auxiliary gear train 2 is shifted from the up position to the down position by the operation of the shift solenoid 118 for the auxiliary gear train 2, the hydraulic pressure of the direct clutch 32 begins to be discharged in a similar manner to in 0 range, and the 1st hydraulic passage 112 is subject to the hydraulic pressure. In this case, since the 1st hydraulic passage 112 is connected with the 3rd hydraulic passage 180 through the orifice bypass valve 170, the hydraulic fluid flows rapidly in the 3rd hydraulic passage 180, and the piston 154 of the reduction brake accumlator 132 immediately finishes stroking, causing rapid increase of the hydraulic pressure of the reduction brake 33. As a result, the hydraulic pressure varies as indicated by the dotted line in FIG. 5 and the reduction brake 33 begins to be engaged immediately by the higher pressure, reducing a time required for shifting. Thus, shifting to the 3rd speed position is performed rapidly, resulting in quick engine brake.

What is claimed is:

1. A shift control system for an automatic transmission, the automatic transmission including a main gear train and an auxiliary gear train operatively coupled therewith, the auxiliary gear train including a first friction element for high gear position and a second friction element for low gear position, the shift control system comprising:
- a source of hydraulic fluid;
- a first hydraulic passage;
- a second hydraulic passage connected with the first friction element;
- a third hydraulic passage connected with the second friction element;
- a one-way orifice means connected between said first and third hydraulic passage for delaying transmission of an increase in hydraulic fluid pressure in said first hydraulic passage to said third hydraulic passage;
- a shift valve connected with said first hydraulic passage and including a spool movable between a first position where said first passage is connected with said source and hydraulic fluid is discharged from said second passage, and a second position where said second passage is connected with said source and hydraulic fluid is discharged from said first passage;
- a bypass valve connected with said first and third hydraulic passages in parallel with said one-way orifice means, said bypass valve including a spool, a spring and a pilot port, said spool including means for defining a bypass passage and being movable between an interrupting postion where said first passage is prevented from communicating with said third passage through said bypass passage, and a connecting position where said first passage is allowed to communicate with said third passage through said bypass passage, said spool being pressed to said interrupting position by said spring, said spool being pressed in the direction opposite to a force of said spring when said pilot port is supplied with a predetermined hydraulic pressure; and
- means for supplying said predetermined hydraulic pressure when an engine brake is required.

2. A shift control system as defined in claim 1, wherein said auxiliary gear train includes a planetary gear set having an internal gear, a pinion carrier and a sun gear.

3. A shift control system as defined in claim 1, wherein said first friction element includes a direct clutch, and said second friction element includes a reduction clutch.

4. In an automatic transmission:
- a main gear train;
- an auxiliary gear train operatively coupled with said main gear train, said auxiliary gear train including an output shaft, a first friction element for high gear position and a second friction element for low gear position, said auxiliary gear train including a planetary gear set having an internal gear, a pinion carrier and a sun gear, said internal gear being connected with said main gear train, said pinion carrier being connected with said output shaft of said auxiliary gear train, said sun gear being adapted to be held stationary by said second friction element, said first friction element connecting two of said internal gear, pinion carrier and sun gear with each other;
- a source of hydraulic fluid;
- a first hydraulic passage;
- a second hydraulic passage connected with the first friction element;
- a third hydraulic passage connected with the second friction element;
- a one-way orifice means connected between said first and third hydraulic passage for delaying transmission of an increase in hydraulic fluid pressure in said first hydraulic passage to said third hydraulic passage;
- a shift valve connected with said first hydraulic passage and including a spool movable between a first position where said first passage is connected with said source and hydraulic fluid is discharged from said second passage, and a second position where said second passage is connected with said source and hydraulic fluid is discharged from said first passage;
- a bypass valve connected with said first and third hydraulic passages in parallel with said one-way orifice means, said bypass valve including a spool, a spring and a pilot port, said spool including means for defining a bypass passage and being movable between an interrupting position where said first passage is prevented from communicating with said third passage through said bypass passage, and a connecting position where said first passage is allowed to communicate with said third passage through said bypass passage, said spool being pressed to said interrupting position by said spring, said spool being pressed in the direction opposite to a force of said spring when said pilot port is supplied with a predetermined hydraulic pressure; and
- means for supplying said predetermined hydraulic pressure when an engine brake is required.

5. A shift control system as defined in claim 1, wherein said predetermined hydraulic pressure supplying means includes a fourth hydraulic passage for outputting a third driving range pressure.

* * * * *